US008691080B2

(12) United States Patent
Haizmann

(10) Patent No.: US 8,691,080 B2
(45) Date of Patent: Apr. 8, 2014

(54) SLURRY HYDROCRACKING APPARATUS OR PROCESS

(75) Inventor: Robert Haizmann, Rolling Meadows, IL (US)

(73) Assignee: UOP LLC, Des Plaines, IL (US)

( * ) Notice: Subject to any disclaimer, the term of this patent is extended or adjusted under 35 U.S.C. 154(b) by 853 days.

(21) Appl. No.: 12/813,468

(22) Filed: Jun. 10, 2010

(65) Prior Publication Data

US 2011/0303580 A1  Dec. 15, 2011

(51) Int. Cl.
*C10G 47/26* (2006.01)
*C10G 47/12* (2006.01)
*C10G 47/18* (2006.01)
*C10G 47/20* (2006.01)

(52) U.S. Cl.
USPC ...... 208/108; 208/100; 208/111.2; 208/111.3; 208/111.35

(58) Field of Classification Search
USPC ............... 208/39, 40, 95, 100, 108, 424, 425, 208/111.2, 111.3, 111.35
See application file for complete search history.

(56) References Cited

U.S. PATENT DOCUMENTS

| | | | | |
|---|---|---|---|---|
| 4,345,991 A | * | 8/1982 | Stegelman | 208/78 |
| 4,495,062 A | * | 1/1985 | Hensley et al. | 208/111.2 |
| 4,525,267 A | | 6/1985 | Inooka | |
| 4,591,426 A | * | 5/1986 | Krasuk et al. | 208/96 |
| 4,606,809 A | | 8/1986 | Garg | |
| 4,762,812 A | | 8/1988 | Lopez et al. | |
| 4,834,869 A | | 5/1989 | Angevine et al. | |
| 4,954,240 A | * | 9/1990 | Eidt et al. | 208/50 |
| 5,154,819 A | | 10/1992 | Clark et al. | |
| 5,755,955 A | | 5/1998 | Benham et al. | |
| 6,090,859 A | | 7/2000 | Howsmon et al. | |
| 6,217,746 B1 | * | 4/2001 | Thakkar et al. | 208/59 |
| 6,291,391 B1 | | 9/2001 | MacArthur | |
| 6,838,487 B1 | | 1/2005 | Demirel et al. | |
| 2002/0112987 A1 | * | 8/2002 | Hou et al. | 208/108 |
| 2007/0158239 A1 | | 7/2007 | Satchell | |
| 2009/0127161 A1 | | 5/2009 | Haizmann et al. | |
| 2009/0159505 A1 | | 6/2009 | Da Costa et al. | |
| 2009/0299112 A1 | | 12/2009 | Bauer et al. | |

(Continued)

FOREIGN PATENT DOCUMENTS

WO    2008151792 A1    12/2008

OTHER PUBLICATIONS

Benham et al., "Canmet Residuum Hydrocracking: Advances Through Control of Polar Aromatics", National Petroleum Refiners Association 1996 Annual Meeting Paper, 1996, No. AM-96-58, pp. 26 pages.

(Continued)

*Primary Examiner* — Renee E Robinson
(74) *Attorney, Agent, or Firm* — James C Paschall

(57) ABSTRACT

One exemplary embodiment can include a slurry hydrocracking process. The process can include combining one or more hydrocarbons and a slurry hydrocracking catalyst as a feed to a slurry hydrocracking reaction zone, fractionating an effluent from the slurry hydrocracking reaction zone, separating the pitch from at least a portion of the slurry hydrocracking catalyst, and recycling the suspension to the slurry hydrocracking reaction zone. The slurry hydrocracking catalyst may include a support. Fractionating the effluent may provide a light vacuum gas oil, a heavy vacuum gas oil, and a mixture comprising a pitch and the slurry hydrocracking catalyst. Generally, the separated slurry hydrocracking catalyst is comprised in a suspension.

19 Claims, 1 Drawing Sheet

(56) References Cited

U.S. PATENT DOCUMENTS

2009/0321314 A1 12/2009 Bhattacharyya et al.
2009/0321315 A1 12/2009 Bhattacharyya et al.
2009/0326303 A1 12/2009 Bhattacharyya et al.
2010/0122934 A1 5/2010 Haizmann et al.

OTHER PUBLICATIONS

Dunn et al., "Recycle of Vanadium and Nickel-Based Catalysts in a Hydroconversion Process", Energy & Fuels, Jan./Feb. 2003, vol. 17, No. 1, pp. 38-45.

Rispoli et al., "Advanced Hydrocracking Technology Upgrades Extra Heavy Oil", Hydrocarbon Processing, Dec. 2009, vol. 88, No. 12, pp. 39-46.

Sugimoto, "Slurry Phase Hydrocracking of Heavy Oil Over Ni-Mo/Carbon Catalyst", 16th Saudi Arabia-Japan Joint Symposium, Nov. 5-6, 2006, p. 10 pages.

Zhang et al., "A Review of Slurry-Phase Hydrocracking Heavy Oil Technology", Energy & Fuels, Nov./Dec. 2007, vol. 21, No. 6, pp. 3057-3062.

\* cited by examiner

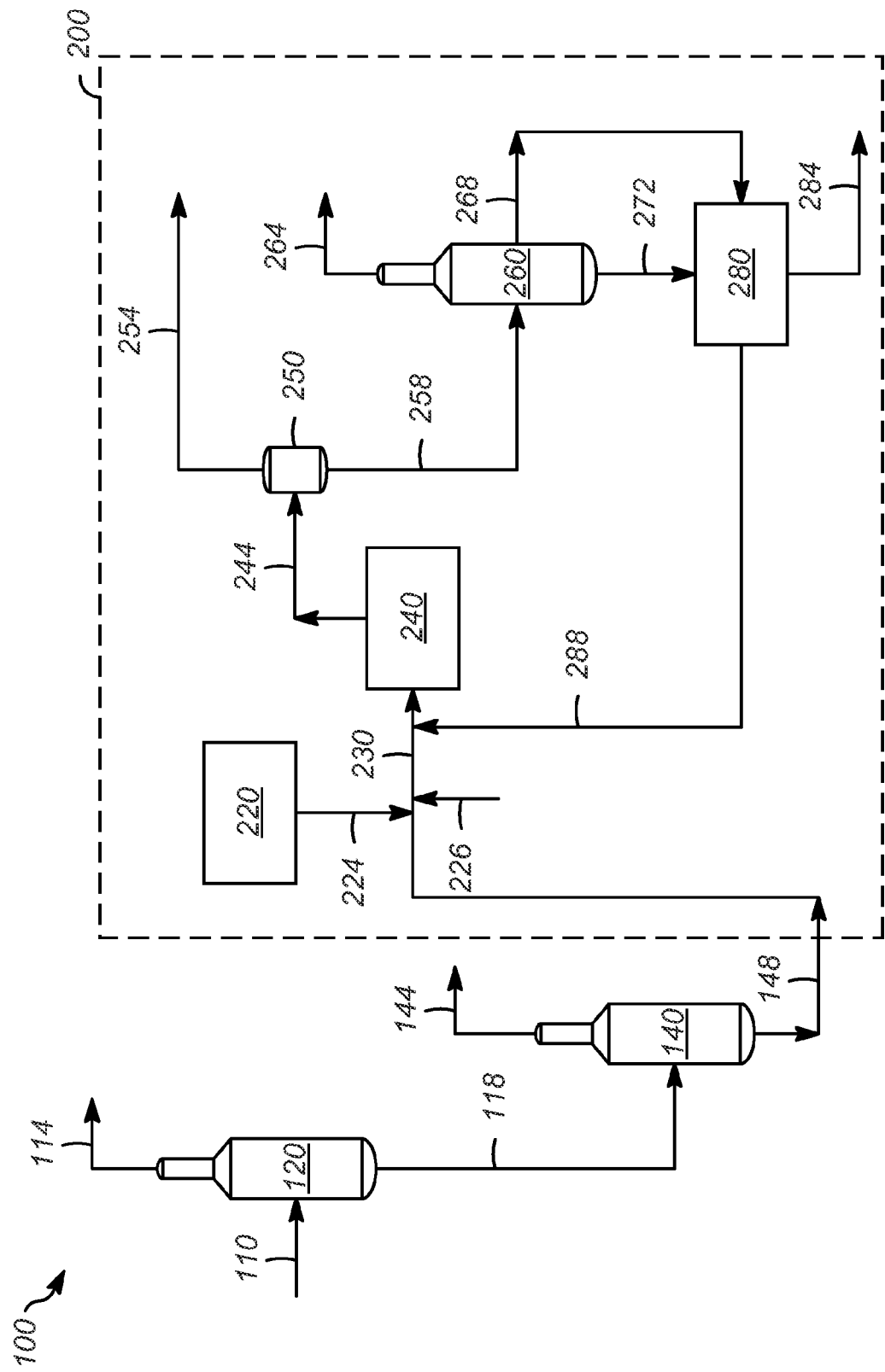

SLURRY HYDROCRACKING APPARATUS OR PROCESS

FIELD OF THE INVENTION

This invention generally relates to a slurry hydrocracking apparatus and process.

DESCRIPTION OF THE RELATED ART

Slurry hydrocracking can achieve a high conversion of heavy feed stocks, such as vacuum residues, to lower boiling, more valuable distillate products. However, a portion of the product can remain non-distilled after vacuum distillation, typically unconverted pitch that may have a boiling point greater than about 500° C. This high boiling material can have a very low value due to high viscosity, portability difficulties, and high levels of undesired components, such as sulfur contaminants and a slurry hydrocracking catalyst used to convert the feedstock. Typically, the particle size of the slurry catalyst is minimized to facilitate hydrocracking reactions, which may impede subsequent separation attempts.

The presence of these undesired components in the unconverted pitch can prevent its utilization as a valuable commodity, such as combustion fuel, or require expensive remediation processes to remove the contaminants, such as sulfur, present in the entrained catalyst. As a result, it would be highly desirable to provide a mechanism for separating the pitch from the catalyst after vacuum distilling to improve utilization of the pitch.

SUMMARY OF THE INVENTION

One exemplary embodiment can include a slurry hydrocracking process. The process can include combining one or more hydrocarbons and a slurry hydrocracking catalyst as a feed to a slurry hydrocracking reaction zone, fractionating an effluent from the slurry hydrocracking reaction zone, separating the pitch from at least a portion of the slurry hydrocracking catalyst, and recycling the suspension to the slurry hydrocracking reaction zone. The slurry hydrocracking catalyst may include a support. Fractionating the effluent may provide a light vacuum gas oil, a heavy vacuum gas oil, and a mixture including a pitch and the slurry hydrocracking catalyst. Generally, the separated slurry hydrocracking catalyst is comprised in a suspension.

Another exemplary process for recycling a slurry hydrocracking catalyst including one or more particles may include combining the catalyst particles with a vacuum bottom stream to form a feed, passing the feed into a slurry hydrocarbon reaction zone to create an effluent, fractionating at least a portion of the effluent to obtain a mixture, separating the catalyst particles from the mixture, and recycling the catalyst particles directly to the slurry hydrocracking reaction zone.

Yet a further embodiment may be a slurry hydrocracking apparatus. The slurry hydrocracking apparatus can include a slurry hydrocracking reaction zone providing an effluent including one or more hydrocarbons and a slurry hydrocracking catalyst; a vacuum fractionation zone receiving the effluent and providing a mixture including the slurry hydrocracking catalyst; a filtration zone adapted to filter the mixture to provide a retentate including the slurry hydrocracking catalyst and a filtrate including a pitch; and a line communicating the retentate from the filtration zone for recycling the retentate to the slurry hydrocracking reaction zone.

The embodiments disclosed herein can utilize a catalyst of sufficient size to facilitate its separation from the pitch. In some exemplary embodiments, the catalyst can be supported to prevent its disintegration in the reaction zone. The catalyst can be separated from the pitch utilizing any suitable mechanism, such as filtering, centrifuging, or settling. As a result, the catalyst can be recycled back to the slurry hydrocracking reaction zone without any additional processing, such as regeneration or rejuvenation. Moreover, the pitch separated from the catalyst can be utilized in any suitable application, such as combustion fuel for a furnace.

DEFINITIONS

As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "substantially" can mean an amount of generally at least about 80%, preferably about 90%, and optimally about 99%, by weight, of a compound, class of compounds, or catalyst.

As used herein, the term "feed" as provided to a slurry hydrocracking reaction zone can mean at least one of one or more hydrocarbons and a slurry hydrocracking catalyst, and optionally include one or more recycled materials.

BRIEF DESCRIPTION OF THE DRAWING

FIG. 1 is a schematic depiction of an exemplary refining apparatus including an exemplary slurry hydrocracking apparatus.

DETAILED DESCRIPTION

Referring to FIG. 1, an exemplary refining apparatus 100 is depicted including a slurry hydrocarbon apparatus 200. The refining apparatus can include a line 110 providing a feed 110, such as a crude oil, to an atmospheric fractionation zone 120. The lines in the drawing may be referred to interchangeably as feeds, effluents, streams, or lines.

The atmospheric fractionation zone 120 can produce one or more overhead streams 114 and an atmospheric bottom stream 118. The one or more overhead streams 114 can include a variety of products, such as light gases, gasoline, diesel, and kerosene. These one or more overhead streams 114 can exit the atmospheric fractionation zone 120 separately or in combination. The atmospheric bottom stream 118 can typically include a heavy hydrocarbon boiling at or above about 340° C. The atmospheric bottom stream 118 can be provided to a first vacuum fractionation zone 140. The first vacuum fractionation zone 140 can, in turn, provide an overhead stream 144 and a vacuum bottom stream 148. Typically, the overhead stream 144 can include one or more compounds boiling above about 300° C. The vacuum bottom stream 148 can include material boiling above about 500° C. This vacuum bottom stream 148 can be provided as a portion 148 of a feed 230 to the slurry hydrocracking apparatus 200. Although the vacuum bottom stream 148 is depicted as being provided to the slurry hydrocracking apparatus 200, it should be known that any suitable feed in any combination could be provided, such as a vacuum gas oil, a vacuum residue, or a fluidized catalytic cracking gas oil boiling, respectively, above about 425° C., above about 510° C., or above about 400° C. Generally, any suitable portion 148 of the feed 230 can be provided to the slurry hydrocracking apparatus 200 that may have, e.g., about 90%, by weight, boiling above a temperature of at least about 300° C. at an atmospheric equivalent boiling point as calculated from observed boiling temperature and distillation pressure, as determined by ASTM D1160-06. Such a feed portion 148 can have an API gravity of no more than about 20°, and typically no more than about 10°.

The slurry hydrocracking apparatus 200 can include a catalyst sizing zone 220, a slurry hydrocracking reaction zone 240, a hot, high pressure separation zone 250, a second vacuum fractionation zone 260, and a separation zone 280. Generally, the catalyst sizing zone 220 can have any suitable apparatus for shaping catalytic material to any suitable size, such as a mean catalyst particle size of about 2-about 100 microns, preferably about 2-about 20 microns, as determined by the dry method as disclosed in, e.g., US 2009/0321314 A1. In other exemplary embodiments, the mean catalyst particle size can be about 10-about 100 microns. Typically, the catalyst sizing zone 220 can include any suitable mill to grind catalytic material to particles having a mean particle diameter of about 2-about 100 microns. Usually, any suitable material can be utilized having suitable catalyst dimensions. As an example, exemplary catalyst compounds can include a catalytically effective amount of one or more compounds having iron. Particularly, the one or more compounds can include at least one of an iron oxide, an iron sulfate, and an iron carbonate. Other forms of iron can include at least one of an iron sulfide, a pyrrhotite, and a pyrite. What is more, the catalyst can contain materials other than an iron, such as at least one of molybdenum, nickel, and manganese, and/or a salt, an oxide, and/or a mineral thereof.

Preferably, the one or more compounds includes an iron sulfate, and more preferably at least one of an iron sulfate monohydrate and an iron sulfate heptahydrate. Oxidic iron-containing compounds obtained from sources such as a limonite, a laterite, a wrought iron, a clay, a magnetite, a hematite, a gibbsite, or a Kisch iron can also be used. One particularly desired material is ferrous sulfate. The ferrous sulfate can either be a monohydrate or a heptahydrate.

Desirably, one or more catalyst particles can include about 2-about 45%, by weight, iron oxide and about 20-about 90%, by weight, alumina. In one exemplary embodiment, iron-containing bauxite is a preferred material having these proportions. Bauxite can have about 10-about 40%, by weight, iron oxide ($Fe_2O_3$), and about 54-about 84%, by weight, alumina and may have about 10-about 35%, by weight, iron oxide and about 55-about 80%, by weight, alumina. Bauxite also may include silica ($SiO_2$) and titania ($TiO_2$) in amounts of usually no more than about 10%, by weight, and typically in amounts of no more than about 6%, by weight. Volatiles such as water and carbon dioxide may also be present, but the foregoing weight proportions exclude such volatiles. Iron oxide is also present in bauxite in a hydrated form, but again the foregoing proportions exclude water in the hydrated composition.

In another exemplary embodiment, it may be desirable for the catalyst to be supported. Such a supported catalyst can be relatively resilient and maintain its particle size after being processed through the slurry hydrocracking reaction zone 240. As a consequence, such a catalyst can include a support of alumina, silica, titania, one or more aluminosilicates, magnesia, bauxite, coal and/or petroleum coke. Such a supported catalyst can include a catalytically active metal, such as at least one of iron, molybdenum, nickel, and vanadium, as well as sulfides of one or more of these metals. Generally, the catalyst can have about 0.01-about 30%, by weight, of the catalytic active metal based on the total weight of the catalyst.

Generally, it is desirable to have a catalyst of sufficient size to allow it to be readily filtered, centrifuged, settled, or otherwise separated from an unconverted pitch, as hereinafter described. If the catalyst is too small, separation may be difficult. As a consequence, it is desirable for the catalyst to be of a minimum dimension.

Ground catalysts of suitable size can be communicated via a line 224 from the catalyst sizing zone 220 and be combined with the vacuum bottom stream 148. Afterwards, hydrogen may be provided via a line 226 to form the feed 230 for the slurry hydrocracking reaction zone 240. Generally, the hydrogen in the line 226 can include recycled and/or make-up hydrogen, and as such can include other light hydrocarbon molecules, such as methane and ethane.

The slurry hydrocracking reaction zone 240 can receive the feed 230 and a recycle stream from a line 288, as hereinafter described, and provide an effluent 244. Generally, the slurry hydrocracking reaction zone 240 can include a reactor operating either in up-flow or down-flow. One exemplary reactor can be a tubular reactor through which the feed, catalyst, and gas pass upwardly. Generally, the temperature can be about 400-about 500° C., preferably about 440-about 465° C., and a pressure of about 3-about 24 MPa, preferably about 10-about 18 MPa. The liquid hourly space velocity is typically below about 4 $hr^{-1}$.

The gas-liquid mixture or fluid is withdrawn through the line 244 and provided to a hot, high pressure separation zone 250. The hot, high pressure separation zone 250 can include a separator operating at a temperature of about 200-about 470° C. and a pressure of about 3-about 24 MPa, preferably about 10-about 18 MPa. Generally, a first fluid stream 254 including naphtha can be withdrawn. The first fluid stream 254 may include about 35-about 80%, by volume, of the hydrocarbon product from the slurry hydrocracking reaction zone 240 as well as hydrogen. The hydrogen can be recovered and optionally recycled to be comprised in the stream 226. A second fluid stream 258 can be provided to the second vacuum fractionation zone 260.

Usually, the second vacuum fractionation zone 260 can include a vacuum fractionation column that can be operated at any suitable temperature to provide an atmospheric equivalent cut point between a light vacuum gas oil and a heavy vacuum gas oil of about 250-about 500° C. In addition, the vacuum fractionation column can be operated at a pressure of about 1-about 10 kPa. Generally, the vacuum distillation column can provide a light vacuum gas oil in a line 264, a heavy vacuum gas oil in a line 268, and a mixture including a pitch or a vacuum residue and at least a part or all of the slurry hydrocracking catalyst in a line 272. Typically, the light vacuum gas oil can have a boiling point of about 230-about 450° C., the heavy vacuum gas oil can have a boiling point range of about 260-about 500° C., and the pitch or vacuum residue can have an initial boiling point of at least about 530° C. Generally, the catalyst from the second vacuum fractionation zone 260 concentrates in the pitch to form the mixture withdrawn through the line 272. The mixture may include no more than about 40%, no more than about 30%, or even no more than about 20%, by weight, of catalyst with respect to the total weight of pitch and catalyst in the line 272. The mixture in the line 272 can be provided to the separation zone 280.

The separation zone 280 can include any suitable device for separating the pitch from the slurry hydrocracking catalyst. The pitch can be separated by using filtering, centrifuging, or settling. In one exemplary filtration system, a vessel can form an upper chamber and a lower chamber. The mixture in the line 272 can be provided to the bottom chamber with the filtrate exiting an upper chamber. The vessel can contain a plate forming a plurality of apertures with corresponding filter modules coupled at the apertures descending therefrom, thereby forming a filter candle assembly. Such a filter system is available from Filtrex Systems of Attleboro, Mass.

Usually, if a filter system is utilized, the filter system can be operated at any suitable temperature, such as about 300-about 450° C. Typically, an effective temperature is selected to ensure that the pitch is in a liquid phase and has a sufficiently low viscosity to allow efficient filtration. Generally, the filter system can provide a filtrate, which is typically the pitch substantially absent of the slurry hydrocarbon catalyst, e.g., no more than about 1%, by weight, the slurry hydrocarbon catalyst, and a retentate typically including the slurry hydrocarbon catalyst. Generally, when using a filter system, the filter system can be backwashed, for example, by providing at least a part of the heavy vacuum gas oil from the line 268 to the upper chamber to flush out the retentate. The retentate can be discharged through the line 288 while the filtrate containing the pitch substantially absent of the catalyst can be discharged as a product via a line 284.

Typically, the retentate can include a suspension having the catalyst and a heavy vacuum gas oil from the line 268. The suspension in the line 288 can include the catalyst entrained in the heavy vacuum gas oil. The recycle stream including the suspension can include at least about 5%, by weight, of the catalyst based on the total weight of the catalyst and a fluid, typically the heavy vacuum gas oil. Moreover, the recycle stream can recover at least about 50%, preferably at least about 80%, by weight, of the catalyst present in the mixture in the line 272 prior to entering the separation zone 280. This material can be recycled through the line 288 as a recycle stream to or upstream of the slurry hydrocracking reaction zone 240. As depicted, the recycle stream can be provided downstream of the lines 224 and 226 and upstream of the slurry hydrocracking reaction zone 240. In this manner, the slurry hydrocracking catalyst can be recycled directly or indirectly back to the slurry hydrocracking reaction zone 240 without being cleaned or otherwise rejuvenated or regenerated. In other exemplary embodiments, other backwash fluid streams may be used additionally or alternatively to the recycle stream, such as any suitable gas oil, such as light or heavy gas oils. Such suitable oils may include toluene, one or more xylenes, light cycle oil, medium cycle oil, or any combination thereof.

Generally, in the catalyst sizing zone 220, the catalyst can be sized by utilizing any suitable device, such as a mill, to produce a catalyst having the requisite size of about 2-about 100 microns. Alternatively, an ungrounded catalyst may be utilized, such as an ungrounded bauxite. Typically, an ungrounded catalyst is of suitable size as to be easily separated from a mixture including, e.g., at least one hydrocarbon, such as pitch. In addition, utilizing a backwash material such as a heavy vacuum gas oil can allow the catalyst and the heavy vacuum gas oil to be recycled back to the slurry hydrocarbon reaction zone and thus can lower or possibly nearly eliminate the need for make-up slurry hydrocarbon catalyst as well as efficiently recycling the catalyst.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A slurry hydrocracking process, comprising:
  A) combining one or more hydrocarbons and a slurry hydrocracking catalyst comprising a support as a feed to a slurry hydrocracking reaction zone;
  B) fractionating an effluent from the slurry hydrocracking reaction zone to provide a light vacuum gas oil, a heavy vacuum gas oil, and a mixture comprising a pitch and the slurry hydrocracking catalyst;
  C) separating the pitch from at least a portion of the slurry hydrocracking catalyst to obtain a filtrate comprising the pitch and a retentate comprising the slurry hydrocracking catalyst;
  D) backwashing the retentate with at least a part of the heavy vacuum gas oil wherein the separated slurry hydrocracking catalyst is comprised in a suspension; and
  E) recycling the suspension to the slurry hydrocracking reaction zone.

2. The process according to claim 1, wherein the suspension comprises the heavy vacuum gas oil and the slurry hydrocracking catalyst wherein the slurry hydrocracking catalyst comprises at least 50%, by weight, of the slurry hydrocracking catalyst recovered from the mixture.

3. The process according to claim 1, further comprising recycling the retentate to the slurry hydrocracking reaction zone.

4. The process according to claim 1, wherein the slurry hydrocracking catalyst comprises particles having a mean particle diameter of about 2-about 100 microns.

5. The process according to claim 1, further comprising sizing bauxite for obtaining the particles.

6. The process according to claim 1, further comprising separating the effluent from the slurry hydrocracking reaction zone to obtain a first fluid stream comprising a naphtha and a second fluid stream comprising the light vacuum gas oil, the heavy vacuum gas oil, and the pitch.

7. The process according to claim 1, further comprising vacuum fractionating an atmospheric bottom stream to obtain a vacuum bottom stream provided as the one or more hydrocarbons comprised in the feed.

8. The process according to claim 7, further comprising fractionating a crude oil to obtain the atmospheric bottom stream.

9. The process according to claim 1, wherein the support comprises at least one of alumina, silica, titania, one or more aluminosilicates, magnesia, bauxite, coal and petroleum coke.

10. The process according to claim 1, wherein the support comprises at least one of titania, magnesia, bauxite, coal and petroleum coke.

11. The process according to claim 1, wherein the slurry hydrocracking catalyst comprises a catalytic active metal, in turn, comprising at least one of iron, molybdenum, nickel, and vanadium or a sulfide thereof.

12. The process according to claim 11, wherein the slurry hydrocracking catalyst comprises about 0.01- about 30%, by weight, of the catalytic active metal based on the total weight of the catalyst.

13. The process according to claim 1, wherein the slurry hydrocracking catalyst comprises a catalytic active metal, in turn, comprising vanadium or a sulfide thereof.

14. A process for recycling a slurry hydrocracking catalyst comprising one or more particles, comprising:
   A) combining the catalyst particles with a vacuum bottom stream to form a feed;
   B) passing the feed into a slurry hydrocarbon reaction zone to create an effluent;
   C) fractionating at least a portion of the effluent to obtain a mixture and heavy vacuum gas oil;
   D) filtering the catalyst particles from the mixture;
   E) backwashing with at least a part of the heavy vacuum gas oil to remove a retentate; and
   F) recycling the catalyst particles directly to the slurry hydrocracking reaction zone.

15. The process according to claim 14, further comprising recycling the retentate to the slurry hydrocracking reaction zone.

16. The process according to claim 14, wherein the catalyst particles have a sufficient size to allow filtering.

17. The process according to claim 14, wherein the catalyst particles have a mean particle diameter of about 2- about 100 microns.

18. A process for recycling a slurry hydrocracking catalyst comprising one or more particles, comprising:
   A) combining the catalyst particles with a vacuum bottom stream to form a feed;
   B) passing the feed into a slurry hydrocarbon reaction zone to create an effluent;
   C) fractionating at least a portion of the effluent to obtain a mixture and heavy vacuum gas oil;
   D) filtering the catalyst particles from the mixture wherein the catalyst particles comprise:
      1) a support comprising at least one of alumina, silica, titania, one or more aluminosilicates, magnesia, bauxite, coal and petroleum coke; and
      2) a catalytic active metal comprising at least one of iron, molybdenum, nickel, and vanadium or a sulfide thereof;
   E) backwashing with at least a part of the heavy vacuum gas oil to remove a retentate; and
   F) recycling the catalyst particles directly to the slurry hydrocracking reaction zone.

19. The process according to claim 18, wherein the support comprises at least one of titania, magnesia, bauxite, coal and petroleum coke and the catalytic active metal comprises vanadium or a sulfide thereof.

\* \* \* \* \*